United States Patent
Gutierrez et al.

(10) Patent No.: US 11,333,210 B1
(45) Date of Patent: May 17, 2022

(54) METHOD FOR CONTROLLING AIR-CONDITIONING COMPRESSOR, COMPRESSOR AND MOTOR VEHICLE

(71) Applicant: MAHLE International GmbH, Stuttgart (DE)

(72) Inventors: Ernesto Jose Gutierrez, Amherst, NY (US); William R. Bradley, Batavia, NY (US); Richard Bottom, Burt, NY (US)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 17/147,494

(22) Filed: Jan. 13, 2021

(51) Int. Cl.
*F16D 48/06* (2006.01)
*B60H 1/32* (2006.01)
*F16D 121/20* (2012.01)

(52) U.S. Cl.
CPC ......... *F16D 48/064* (2013.01); *B60H 1/3222* (2013.01); *F16D 2121/20* (2013.01); *F16D 2500/1022* (2013.01); *F16D 2500/10418* (2013.01); *F16D 2500/30406* (2013.01); *F16D 2500/70404* (2013.01); *F16D 2500/70418* (2013.01); *F16D 2500/7109* (2013.01)

(58) Field of Classification Search
CPC .............. F16D 48/064; F16D 2121/20; F16D 2500/1022; F16D 2500/10418; F16D 2500/30406; F16D 2500/70404; F16D 2500/70418; F16D 2500/7109; B60H 1/3222
See application file for complete search history.

(56) References Cited

U.S. PATENT DOCUMENTS

| | | | |
|---|---|---|---|
| 6,199,391 B1 * | 3/2001 | Link | B60H 1/3222 62/133 |
| 10,377,205 B2 | 8/2019 | Pursifull | |
| 2007/0080004 A1 * | 4/2007 | Pfund | B60W 30/186 477/181 |
| 2010/0106362 A1 | 4/2010 | Major et al. | |
| 2015/0300427 A1 | 10/2015 | Ueda et al. | |
| 2016/0040733 A1 * | 2/2016 | Staniewicz | F16D 27/025 701/67 |

FOREIGN PATENT DOCUMENTS

DE      102011110311 A1     4/2012

* cited by examiner

*Primary Examiner* — David J Hlavka
(74) *Attorney, Agent, or Firm* — Dickinson Wright PLLC

(57) ABSTRACT

An electromagnetic clutch (1) of an air conditioning compressor (2), in particular for a motor vehicle (11), transmits a torque to a drive shaft (3) of the compressor (2) depending on an electric current (I) being fed to clutch coils (4) of the electromagnetic clutch (1) to generate an electromagnetic clutch force. According to a control method (10), a slippage of the electromagnetic clutch (1) is determined by a difference between the rpms of the electromagnetic clutch (1) and of the drive shaft (3), and is monitored by a slippage sensor (5). The electric current (I) and the resulting clutch force are adjusted dependent on slippage by a pulse width modulation controller (6) of the compressor (2). The pulse width modulation controller (6) is electrically connected to the clutch coils (4) and modulates a pulse width of the electric current (I) fed to the clutch coils (4).

16 Claims, 4 Drawing Sheets

METHOD FOR CONTROLLING AIR-CONDITIONING COMPRESSOR, COMPRESSOR AND MOTOR VEHICLE

TECHNICAL FIELD

The invention relates to a method for controlling an electromagnetic clutch of an air conditioning compressor as wells as to an air conditioning compressor having an electromagnetic clutch that can be controlled by such a method. The invention also concerns a motor vehicle comprising an air conditioning compressor according to the invention.

BACKGROUND

Commonly, air conditioning compressors are driven via an electromagnetic clutch, which clutch can transmit a torque being generated by an external power device to a drive shaft of the compressor without any physical contact to the compressor drive shaft. The electromagnetic clutch main components are a pulley, a coil and a clutch driver. The external power device transmits its torque to the clutch pulley via a serpentine belt. The clutch coil produces an electromagnetic force that engages the clutch driver to the rotating pulley. The amount of transmittable torque usually depends on an electric current, which electric clutch coils are supplied with as to generate an electromagnetic clutch force by which the electromagnetic clutch drives the air conditioning compressor drive shaft. Furthermore, the electrical current fed to the clutch coils in order to generate the electromagnetic clutch force leads to electrical energy consumption. The clutch needs more electrical current during initial engagement of the clutch driver to the rotating pulley. After engagement, the clutch current can be decreased significantly thus reducing the electrical energy consumption of the compressor.

Electromagnetic clutches can slip relative to the pulley when a torque load at the compressor grows beyond the maximum holding force for a given current. Generally speaking, this can happen when there is a lock condition at the compressor and can result in an engine stall condition if the slip condition is not detected in a timely manner. There is a thermal fuse embedded in the clutch coil that provides slip protection, but a trigger time of the thermal fuse is too long in most cases to prevent an engine stall or detect a slip condition fast enough without damage to the clutch. Active Management of the clutch energy consumption requires a control system with a slip sensor providing timely feedback of a slip condition.

The aforementioned aspects lead to a technical conflict between energy saving low clutch forces on the one hand and reduction or avoidance of slippage on the other hand, which conflict several solutions known from the state of the art aim to overcome.

For example, US 2010 0106362 A1 discloses an air conditioning compressor having an electromagnetic clutch, which clutch force is adjusted as a function of an estimated torque load at the drive shaft.

Another solution is known from US 2015/0300427 A1, according to which clutch coils can be supplied with a pulsed electric voltage whose pulse width is modulated by a pulse width modulation controller.

DE 10 2011 110 311 B4 suggests an adjustment of the electric current fed to the clutch coils as a function of an engine rpm and a calculated torque.

Furthermore, U.S. Ser. No. 10/377,205 discloses controlling of the electric voltage being supplied to the clutch coils depending on a discharge pressure of an air conditioning system comprising the compressor with the electromagnetic clutch and on the torque load at the drive shaft and on an engine rpm of an engine driving the clutch.

However, each of those solutions known from the prior art lacks precision in detecting a presence of slippage, as they all monitor parameters that are influenced not only by the slippage itself but also by numerous disturbing events. Consequently, the aforementioned solutions do not provide a reliable reduction or avoidance of slippage, which can cause damage to the clutch and in the worst case create an engine stall condition.

SUMMARY

The present disclosure, in particular to reduce or avoid the afore-stated disadvantages, points out new ways for methods for controlling an electromagnetic clutch of an air conditioning compressor as wells as for air conditioning compressors having an electromagnetic clutch that can be controlled by such a method and for motor vehicles comprising an air conditioning compressor.

The general concept that the present disclosure is based on is to equip an air conditioning compressor with a slippage sensor by which slippage is monitored, such that a presence of slippage can be detected directly and precisely. Depending on whether slippage is detected or not an electromagnetic clutch force of an electromagnetic clutch the compressor comprises is adjusted.

Thus, both a reliable torque transmission and lower energy consumption through an optimal adaption of the clutch-force can be achieved advantageously. It goes without saying that this furthermore leads to a better fail-safe behavior and also to a decrease in fuel consumption and reduced $CO_2$ emissions.

A method according to the invention is intended for controlling an electromagnetic clutch of an air conditioning compressor, in particular for a motor vehicle. The electromagnetic clutch transmits a torque to a drive shaft of the compressor depending on an electric current being fed to clutch coils of the clutch as to generate an electromagnetic clutch force. According to the method a slippage of the electromagnetic clutch is monitored by means of a slippage sensor, such that a presence of slippage can be detected by means of the slippage sensor. In general, such a slippage is determined by a difference in the rpms the clutch and the drive shaft each spin at. In particular the method according to the invention incorporates detecting slippage by measuring compressor drive shaft rpm by sensing the journal counterweight as it rotates past the slippage sensor thus requiring only one sensor. In essence the slippage sensor can measure the rpm of the compressor drive shaft and an algorithm in a pulse width modulation controller can determine a slip condition based on feedback from the slippage sensor. The electric current being fed to the clutch coils and therewith the clutch force is adjusted dependent on the detection of a slip condition, in particular if detected, by means of the pulse width modulation controller of the compressor. The pulse width modulation controller is electrically attached to the clutch coils and modulates a pulse width of the electric current being fed to the clutch coils. As stated already, the method enables reliable torque transmission via the clutch as well as energy savings caused by avoiding unnecessarily high clutch force at low torque load, advantageously.

According to a preferred embodiment of the method, the slippage sensor and the pulse width modulation controller and the clutch coils are connected to one another in a feed-back loop manner. As an advantage, this allows a self-controlling adjustment of the clutch force during an operation of the air conditioning compressor.

According to another advantageous embodiment of the method, the slippage sensor generates a pulsed signal encoding a present rpm-value of the compressor drive shaft. This pulsed signal is supplied to the pulse width modulation controller. The pulse width modulation controller modulates the pulse width of the electric current fed to the clutch coils as a function of the pulsed signal. Such a pulsed signal can be processed particularly quickly with the pulse width modulation controller, which as an advantage reduces lag in the control of the clutch force, and preferably detection of a slip condition.

In another preferred embodiment of the method, a value of the electric current fed to the clutch coils is reduced until a slippage of the electromagnetic clutch is detected. In particular the electric current fed to the clutch coils is reduced to a minimum safe level in which the risk of a slip condition is minimized. If a slip condition is detected the pulse width modulation controller can turn off the clutch, which increases the minimum level of current and re-starts the clutch. Advantageously, this enables a particularly precise approximation of the present clutch force to a value at which slippage just does not occur.

In one advantageous implementation of the method, the rpm at which the electromagnetic clutch spins is monitored by means of a separate sensing device. This allows an increase in precision of slippage detection.

In another preferred embodiment of the method, the slippage sensor is of a non-intrusive type that detects the clutch magnetic field through a compressor hub counterweight. Therewith, the slippage detection can be carried out particularly precisely.

According to another preferred embodiment of the method, the rpm at which the clutch spins is proportional, in particular by a constant transmission ratio, to an rpm of an output shaft of an external power device, in particular of an electric motor or a combustion engine of a motor vehicle. Thus, as an advantage the clutch rpm can be derived from a known rpm of the output shaft of the external power device by usage of an rpm-sensor the external power device is equipped with. The rpm of the external power device can be compared to the rpm measured by the compressor slippage sensor and a slip condition can be detected by comparing the difference in rpms between the two sensors.

In an advantageous embodiment of the method, —in case an activation of air conditioning is requested—at first the electromagnetic clutch force is held on a preset maximum clutch force value for a predetermined period of time before the adjustment of the electric current being fed to the clutch coils is operated. This allows for overcoming the inertia of the rotatable parts of the compressor when it is brought to operation.

According to a preferred embodiment of the method, —in case a slippage of the electromagnetic clutch is detected—a present value of the electric current at the clutch coils is compared to a predetermined maximum current value. In case the present value of the electric current at the clutch coils is below the maximum current value, the value of the electric current fed to the clutch coils is increased. Conversely—in case the present value of the electric current at the clutch is at or above the maximum current value—the value of the electric current fed to the clutch coils is reduced. Preferably, the value of the electric current fed to the clutch coils can be continuously adjusted, such that the electromagnetic clutch can be maintained at a safe level to avoid a slip condition. The clutch coil resistance changes as a function of ambient temperature and precise control of clutch current can be achieved by close loop feedback continuously adjusting the clutch current. By that the failsafe behavior of the clutch can be improved.

According to another preferred embodiment of the method, the present value of the electric current at the clutch coils is compared to a predetermined minimum current value, in case no slippage of the electromagnetic clutch is detected. In case the present value of the electric current at the clutch coils is above the minimum current value, the value of the electric current fed to the clutch coils is reduced to the minimum current value. In opposite case, in which the present value of the electric current at the clutch coils is at or below the minimum current value, the value of the electric current fed to the clutch coils is held at or increased to the minimum current value. This enables a particularly reliable torque transmission via the clutch. The minimum value of current can be dynamically adjusted if a slip is detected.

In one advantageous implementation of the method, the electromagnetic clutch is purposely switched into a slippage state by reducing, in particular eliminating, the electromagnetic clutch force as to deactivate the compressor, in case a deactivation of air conditioning is requested by either a user or a superordinate system or both of the afore-enumerated. The electromagnetic clutch can thus be used as to deactivate the air conditioning compressor.

According to another preferred embodiment of the method, the method is operated repeatedly, in particular unless the electromagnetic clutch is purposely switched into its slippage state. In particular, the clutch is switched of as to be switched into its slippage state. This advantageously leads to a continuous adjustment of the clutch force while the method is operated, such that an optimal relation between transmittable torque and energy consumption is achieved at any time.

According to another advantageous implementation of the method, the electric current being fed to the clutch coils and therewith the clutch force is adjusted by means of the pulse width modulation controller only in case the detected slippage differs from a predetermined target slippage value by more than a predetermined threshold slippage deviation. This allows for damping any effects of disturbing events such like random peaks in the torque load at the drive shaft.

According to another preferred embodiment of the method, the threshold slippage deviation is predetermined as a preset absolute difference between the rpms of the drive shaft and the clutch or a preset ratio of the rpms of the drive shaft to the rpms of the clutch. Advantageously, this enables filtering random deviations from non-random deviations.

The invention also relates to an air conditioning compressor, in particular for a motor vehicle. The air conditioning compressor has an electromagnetic clutch, which is configured to transmit a torque to a drive shaft of the compressor depending on an electric current being fed to clutch coils of the clutch as to generate an electromagnetic clutch force. Furthermore, the compressor comprises a slippage sensor, which is configured to monitor a slippage of the electromagnetic clutch, which slippage is determined by a difference in the rpms the clutch and the drive shaft each spin at, preferably by comparing the period of rotation of the drive shaft to a preset period. Preferably, slippage sensor is configured to monitor slippage of the electromagnetic clutch, such that a presence of slippage can be detected by means of the slippage sensor, which slippage is determined by comparing the period of rotation of the drive shaft to a preset period. If the period of the slip sensor is greater than a preset limit by more than a predetermined number of consecutive samples, clutch slip can be detected. The slip sensor can be a non-intrusive sensor. The sensor preferably detects the clutch magnetic field through journal counterweight as it rotates past the sensor. Preferably, a pulse width modulation controller measures the slip sensor input voltage with its internal A/D converter. The A/D reading can be compared to a high and low voltage threshold. When the input is greater than the set high threshold, the digital value of the input can be interpreted as a logical '1' and when the input is less than the set low threshold, the digital value of the input can be interpreted as a logical '0', or vice versa. In particular, the period of the pulse signal from the slip sensor is proportional to the compressor drive shaft rpm. Note that the high and low voltage thresholds can be re-calculated based on high and low peak signal values of the sensor signal. This allows for the input sensor signal to vary in amplitude and offset as the sensor and compressor conditions change due to clutch current, speed, temperature, or other environmental conditions. The clutch magnetic field decreases/increases with clutch current and can compensate for the slip sensor signal amplitude as a function of clutch current. A presence of slippage can be detected by means of the slippage sensor. The compressor has a pulse modulation controller, which is electrically attached to the clutch coils and which is configured to modulate a pulse width of the electric current being fed to the clutch coils. The electromagnetic clutch is controllable by an afore-described method according to the invention. The advantages of the method according to the invention—as high-lighted above—transfer to the air conditioning compressor according to the invention, which compressor has a clutch that can be controlled by the method.

Furthermore, the invention relates to a motor vehicle, in particular driven by an electric motor or a combustion engine. The motor vehicle has an air conditioning system that comprises an air conditioning compressor according to the invention as described above. The motor vehicle further comprises an external power device, in particular an electric motor or a combustion engine which the motor vehicle can be propelled with, the external power device driving the electromagnetic clutch of the compressor. The advantages of the air conditioning compressor according to the invention—as emphasized above—transfer to motor vehicle according to the invention, which motor vehicle has such a compressor.

Further important features and advantages of the present disclosure become evident from the drawings and from the associated figure description by way of the drawings.

It is to be understood that the features mentioned above and still to be explained in the following may be used in the respective combination disclosed, but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference numbers relate to same or similar or functionally same components.

In the drawings.

DETAILED DESCRIPTION

Figure 1:
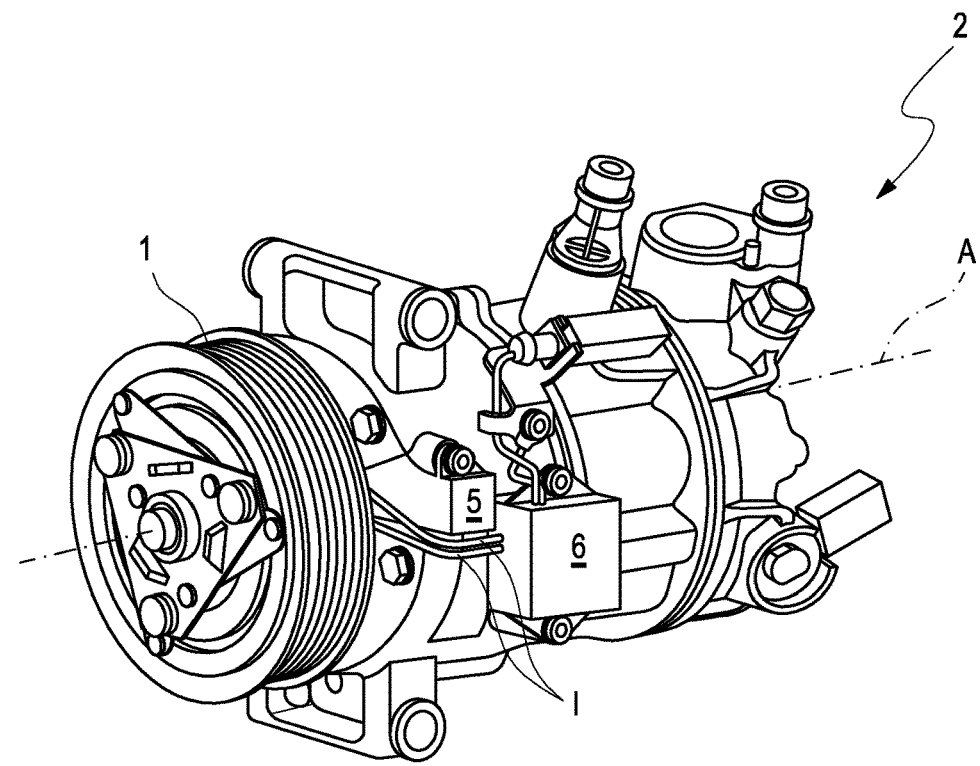
FIG. 1 shows an example of an air conditioning compressor according to the invention in a perspective illustration.

In FIG. 1 an example of an air conditioning compressor 2 is depicted in a perspective view. the air conditioning compressor 2 according to the invention may be suitable for a motor vehicle, which itself is not shown in any of the drawings as a whole. The motor vehicle 11, schematically shown in FIG. 2, that includes the air conditioning compressor 2 is either an electric motor vehicle driven by an electric motor or a conventional vehicle driven by a combustion engine. Either way, the motor vehicle 11 has an external power device 12 which the motor vehicle 11 can be propelled with. In case the motor vehicle 11 is an electric motor vehicle, the external power device 12 is an electric motor. In the opposite case, in which the motor vehicle 11 is a conventional vehicle, its external power device 12 is a combustion engine. The external power device 12 of the motor vehicle 11 drives an electromagnetic clutch 1 of the air conditioning compressor 2.

Figure 2:
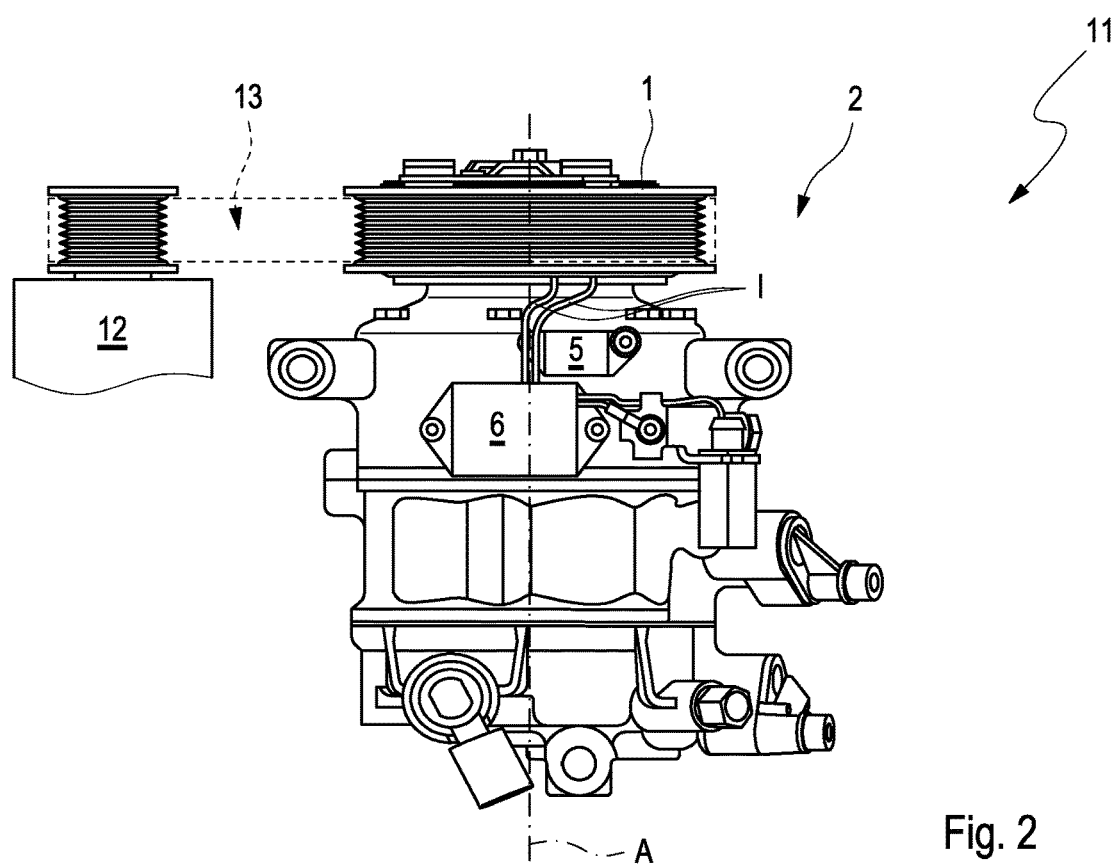
FIG. 2 shows a top view of the air conditioning compressor of FIG. 1 disposed in a partially shown example of a motor vehicle.

FIG. 2 shows the air conditioning compressor 2 of FIG. 1 in a top view in the schematically shown motor vehicle 11. It is to be recognized that the air conditioning compressor 2 has a pulse width modulation controller 6. The pulse width modulation controller 6 is electrically attached to clutch coils 4 of the electromagnetic clutch 1, which clutch coils 4 are not shown in FIGS. 1 and 2. The pulse width modulation controller 6 is configured to modulate a pulse width of an electric current I being fed to the clutch coils 4.

Figure 3:
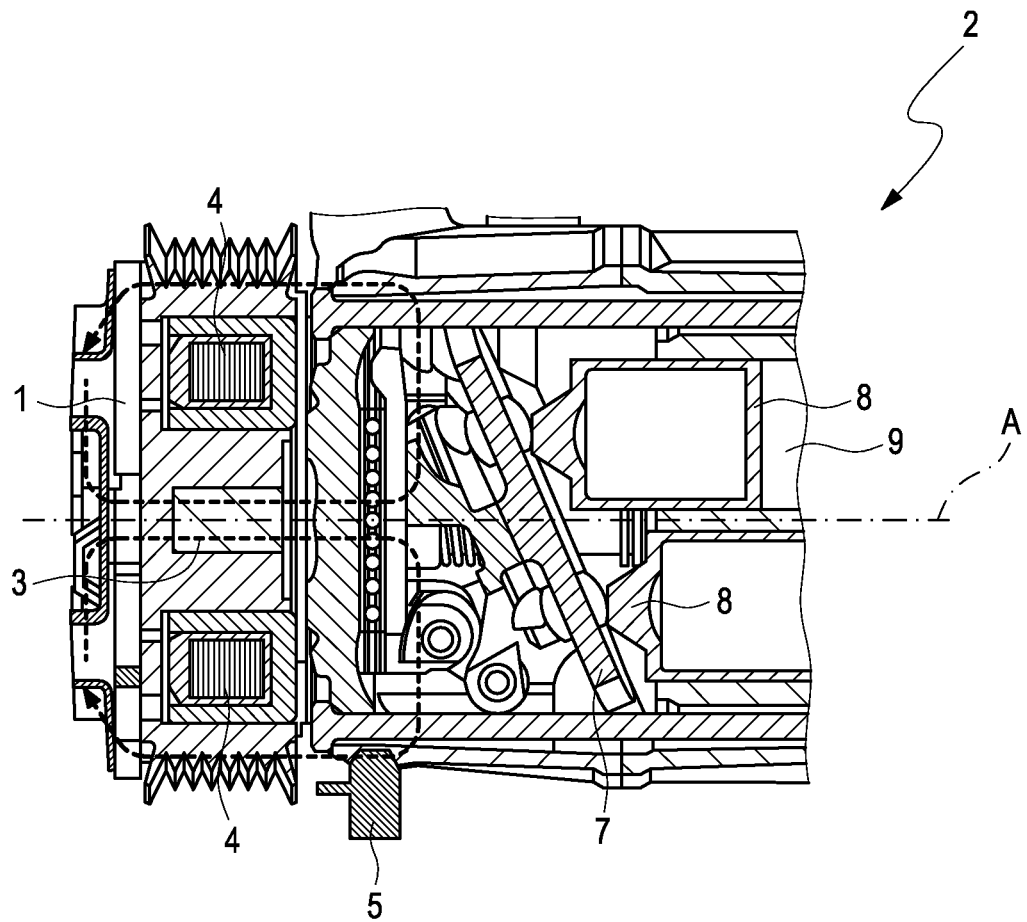
FIG. 3 shows the air conditioning compressor of FIGS. 1 and 2 in a partial illustration of an axial section.

In FIG. 3 a cut-out of an axial section of the air conditioning compressor 2 of FIGS. 1 and 2 is shown. Accordingly, the electromagnetic clutch 1 of the compressor 2 is configured to transmit a torque to a drive shaft 3 of the compressor 2. In the example of FIG. 3 the drive shaft 3 drives a swash plate 7 that can be tilted towards an axis A. The drive shaft 3 and the clutch 1 and the swash plate 7 are configured to be rotated around axis A and are consequently arranged coaxially to one another in the example of FIGS. 1 to 3. A tilt of the swash plate 7 opposite the axis A thus causes an rotational movement of the drive shaft 3 and the swash plate 7 to be converted into a piston stroke of pistons 8 parallel to the axis A as to compress a gaseous fluid compression chambers 9 that are each partially delimited by one of the pistons 8 are loaded with.

In FIG. 3 clutch coils 4 of the electromagnetic clutch 1 are depicted, which are configured to be fed with an electric current I. The torque that is transmitted to the drive shaft 3 by the electromagnetic clutch 1 depends on this electric current I being fed to the clutch coils 4. By the electric current I being fed to the clutch coils 4 an electromagnetic clutch force is generated, which clutch force allows for transmitting torque to the drive shaft 3 via the electromagnetic clutch 1. Furthermore, shown a slippage sensor 5 of the compressor 2 is shown, which slippage sensor 5 is configured to monitor a slippage of the electromagnetic clutch 1. By means of the slippage sensor 5 a presence of slippage can be detected. For example, the slippage is determined by a difference in the rpms the clutch 1 and the drive shaft 3 each spin at. Thus slippage of the electromagnetic clutch 1 is exclusively present, if the rpm of the clutch 1 and the rpm of the drive shaft 3 are not equal to one another. As to adjust the electric current I and therewith the electromagnetic clutch force a pulse width of the electric current I is configured to be modulated by the pulse modulation controller 6 of the compressor 2. The slippage sensor 5 may be of a non-intrusive type that detects the clutch magnetic field through a compressor hub counterweight.

In an alternative example, slippage can be determined by comparing the period of the slip sensor 5 in the compressor 2 to a preset period limit. If the period of the slip sensor 5 is greater than the limit fora predetermined number of consecutive samples, clutch slippage is the to exist. If the sensor signal is less than the period limit, the count is cleared to 0.

Figure 4:
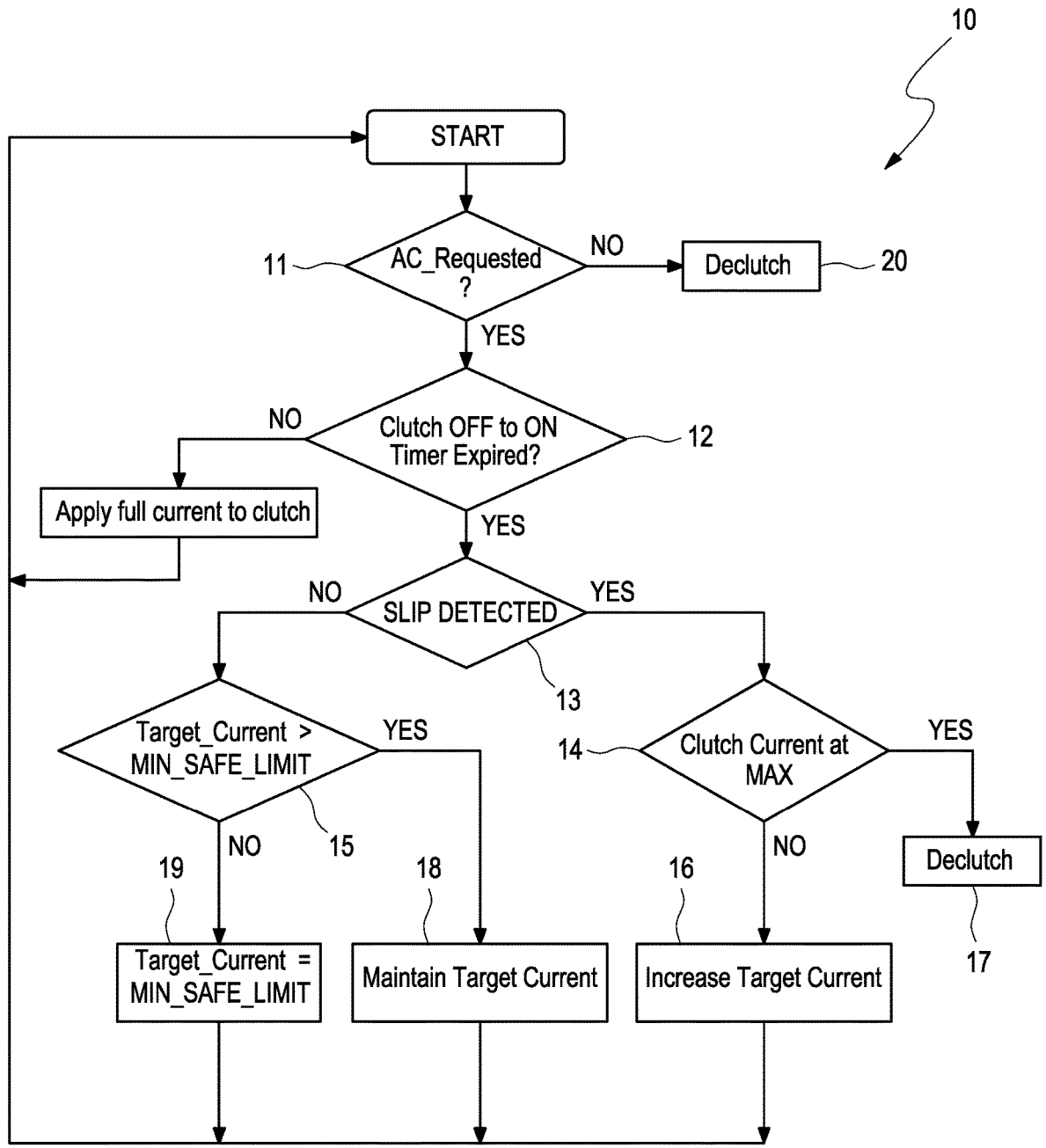
FIG. 4 shows and example of a flow chart of a method according to the invention for controlling an electromagnetic clutch of an air conditioning compressor.

FIG. 4 shows a flow chart of an exemplary method 10 according to the invention, which method 10 is intended to control the electromagnetic clutch 1 of an air conditioning compressor 2 according to the invention like the one that is exemplary illustrated in FIGS. 1 to 3 and described above. According to the method 10 a slippage of the electromagnetic clutch 1 is monitored by the slippage sensor 5 of the air conditioning compressor 2. The slippage sensor 5 can provide a signal to the pulse width modulation controller 6 that allows for detection of a slippage. The modulation controller can have a special algorithm implemented that measures the period of the slippage sensor 5 and determines if a slip condition exists or not. The electric current I being fed to the clutch coils 4 and thus the clutch force is adjusted dependent on the slippage, if slippage is detected. The electric current I is adjusted by means of the pulse width controller 6 of the compressor 2. For this reason, the pulse width controller 6 modulates a pulse width of the electric current I the clutch coils 4 are supplied with.

In the example shown in FIG. 4 the slippage sensor 5 and the pulse width modulation controller 6 and the clutch coils 4 are connected to one another in a feedback loop manner, as to automatically control the electric current I at the clutch coils 4 and thus the resulting clutch force that enables torque-transmission via the clutch 1. The slippage sensor 5 generates a pulsed signal encoding a present rpm-value of the compressor drive shaft 3. This pulsed signal is supplied to the pulse width modulation controller 6. The pulse width modulation controller 6 modulates the pulse width of the electric current I being fed to the clutch coils 4 as a function of the pulsed signal. According to the method 10, a value of the electric current I being fed to the clutch coils 4 is reduced until a slippage of the electromagnetic clutch is detected.

For implementation of the method 10 a separate sensing device may be used, which separate sensing device monitors the rpm at which the electromagnetic clutch 1 spins. The sensing device—which is not depicted in any of the drawings for reasons of clarity—may be a crank shaft rpm-sensor, for example. The rpm at which the clutch 1 spins is proportional to an rpm of an output shaft of an external power device 12, which external power device 12 may be an electric motor or a combustion engine of a motor vehicle 11 (see FIG. 2). The proportion of the rpm of the clutch 1 and the rpm of the output shaft may be predetermined by a constant transmission ratio, e. g. by a gear drive or a belt drive 13 or a chain drive or similar. The output shaft may be a crank nose a crank shaft of a combustion engine axially ends in.

According to method 10—in case an activation of air conditioning is requested—at first the electromagnetic clutch force is held on a preset maximum value for a predetermined time, before any adjusting variation of the electric current I fed to the clutch coils 4 is operated, as is shown in FIG. 4 by decision steps 11 and 12. Furthermore, in case a slippage of the electromagnetic clutch 1 is detected, a present value of the electric current I at the clutch coils 4 is compared to a predetermined maximum current value, which is illustrated by decision steps 13 and 14. According to decision step 14 and process step 16 the value of the electric current I fed to the clutch coils 4 is increased, if the present value of the electric current I at the clutch coils 4 is below the maximum current value. In the opposite case, in which the present value of the electric current I at the clutch coils 4 is at or above the maximum current value, the value of the electric current I fed to the clutch coils 4 is reduced, such that the electromagnetic clutch 1 is purposely switched into a slippage state. Purposely switching into the slippage state is to be understood to declutching synonymously, see decision step 14 and process step 17.

The flow chart of FIG. 4 with its decision steps 13 and 15 also shows, that—in case no slippage of the electromagnetic clutch 1 is detected—the present value of the electric current I at the clutch coils 4 is compared to a predetermined minimum current value. According to decision step 15 and process step 18 the value of the electric current I fed to the clutch coils 4 is maintained at its present value, in case the present value of the electric current I at the clutch coils 4 is above the minimum current value. In the opposite case, in which the present value of the electric current I at the clutch coils 4 is at or below the minimum current value, the value of the electric current I being fed to the clutch coils 4 is held or increased to the minimum current value, see decision step 15 and process step 19.

In view of FIG. 4 it is also to be recognized that in case a deactivation of air conditioning is requested—which synonymously means no air conditioning being requested according to decision step 11—the electromagnetic clutch 1 is purposely switched into its slippage state by reducing the electromagnetic clutch force as to deactivate the compressor 2, see process step 20. Reducing the electromagnetic clutch force may be carried out by eliminating the clutch force. The deactivation of air conditioning may be requested by either a user or a superordinate system or both.

It also can be derived from FIG. 4 that the method 10 is operated repeatedly. In the illustrated example, method 10 is operated repeatedly unless the electromagnetic clutch 1 is purposely switched into its slippage state. After a refreshed request for air conditioning, the method 10 can be started over again, in case a declutching has previously occurred.

Additionally or alternatively to the example of the method 10 shown in FIG. 3, the electric current I being fed to the clutch coils 4 and therewith the clutch force is adjusted by the pulse width modulations controller 6 only in case the detected slippage differs from a predetermined target slippage value by more than a predetermined threshold slippage deviation. The threshold slippage deviation is determined as a preset absolute difference between the rpms of the drive shaft 3 and the clutch 1 or as a preset ratio of the rpms of the drive shaft 3 to the rpms the clutch 1. The latter may be called slippage ratio, wherein a certain slippage ratio can be tolerated, before an adjustment of the clutch force is operated.

Figure 5:
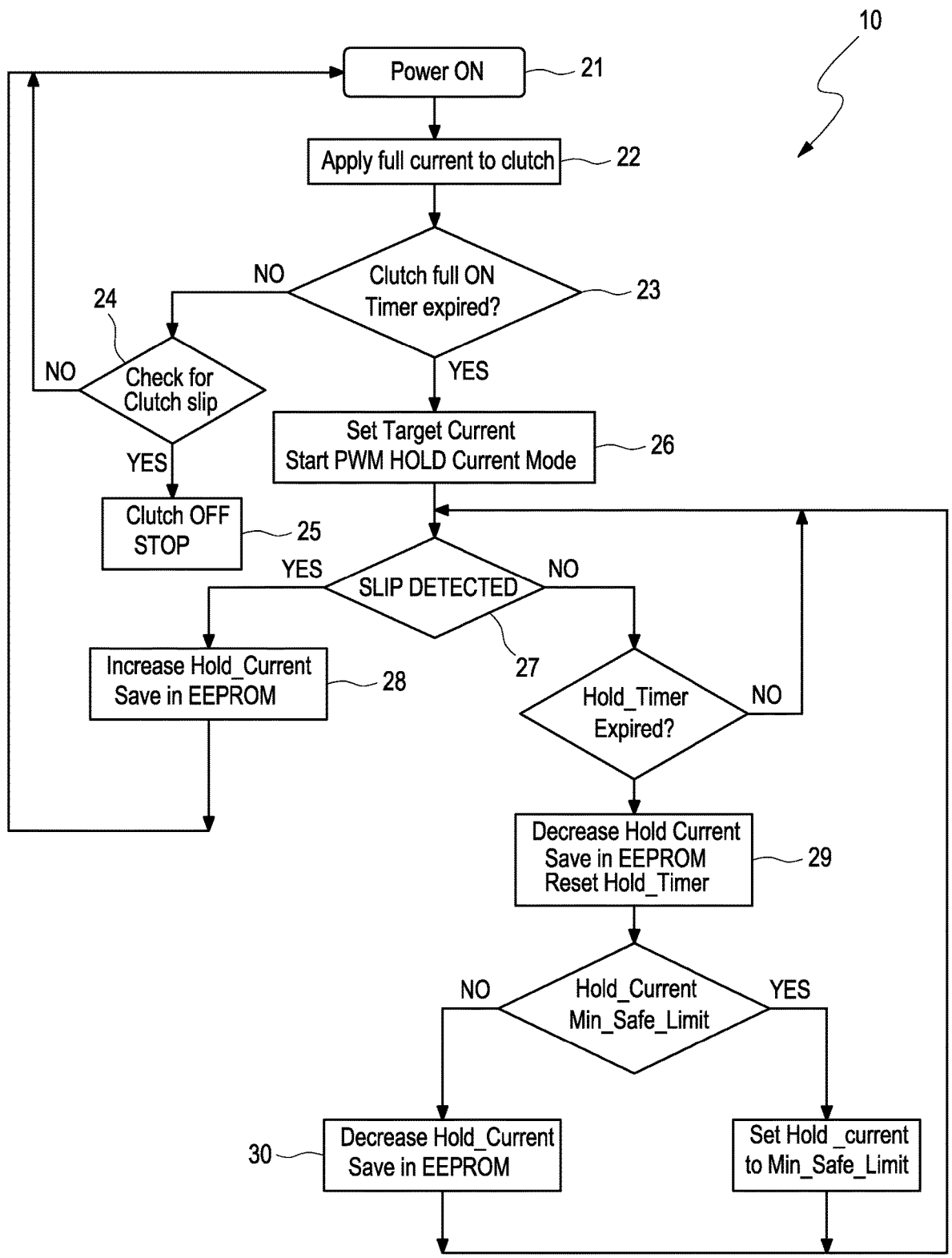
FIG. 5 shows a flow chart of another example of the method according to the invention.

FIG. 5 shows a flow chart of another example of the method 10 according to the invention. According to FIG. 5, in case an activation of air conditioning is requested, the modulation controller 6 is configured to apply a maximum current—full on output, see steps 21 and 22. The current then will remain at maximum for a preset time, see step 23. During this preset time, the slip sensor signal may be used for clutch slippage determination (step 24). If a clutch slippage is detected, the clutch can be turned off, see step 25. If a slippage is not detected after the preset time of full on current, the modulation controller 6 then may apply a pulse width modulated signal and adjust the output automatically so as to control to a set hold current, see step 26. In case at the hold current clutch slippage is detected (step 27), the hold current set-point can be increased (step 28) and the controller 6 then can be started over as to apply a full on current (maximum current) (step 21). If clutch slippage is not detected, then the current set-point can be decreased (step 29) and the new set-point can be stored in an EEPROM (step 30). This can occur only once per power cycle.

While the above description constitutes the preferred embodiments of the present invention, the invention is susceptible to modification, variation and change without departing from the proper scope and fair meaning of the accompanying claims.

The invention claimed is:

1. A method (10) for controlling an electromagnetic clutch (1) of an air conditioning compressor (2) for a motor vehicle (11), the electromagnetic clutch transmitting a torque to a drive shaft (3) of the compressor (2) depending on an electric current (I) being fed to clutch coils (4) of the electromagnetic clutch (1) as to generate an electromagnetic clutch force, the method comprising the following steps:
   determining and monitoring a presence of slippage of the electromagnetic clutch (1) by a difference between rpms of the electromagnetic clutch (1) and rpms of the drive shaft (3) via a slippage sensor (5), and
   adjusting the electric current (I) fed to the clutch coils (4) to adjust a clutch force, dependent on the slippage via a pulse width modulation controller (6) of the compressor (2), the pulse width modulation controller (6) being electrically connected to the clutch coils (4) and modulating a pulse width of the electric current (I) being fed to the clutch coils (4).

2. The method (10) according to claim 1,
   wherein the slippage sensor (5) and the pulse width modulation controller (6) and the clutch coils (4) are connected to one another in a feedback loop manner.

3. The method (10) according to claim 1, further comprising the steps of:
   generating, via the slippage sensor (5), a pulsed signal encoding a present rpm-value of the compressor drive shaft (3),
   supplying the pulsed signal to the pulse width modulation controller (6),
   modulating, via the pulse width modulation controller (6), the pulse width of the electric current (I) fed to the clutch coils (4) as a function of the pulsed signal.

4. The method (10) according to claim 1, further comprising the step of:
   reducing a value of the electric current (I) fed to the clutch coils (4) until a slippage of the electromagnetic clutch (1) is detected.

5. The method (10) according to claim 1,
   wherein the rpms of the electromagnetic clutch (1) are monitored by a separate sensing device.

6. The method (10) according to claim 1,
   wherein the slippage sensor (5) is non-intrusive and detects the clutch magnetic field through a compressor hub counterweight.

7. The method (10) according to claim 1,
   wherein the rpms of the electromagnetic clutch (1) are proportional to rpms of an output shaft of an external power device (12).

8. The method (10) according to claim 1, further comprising the following steps:
   in response to a request for an activation of an air conditioning operation, initially holding the electromagnetic clutch force on a preset maximum clutch force value for a predetermined period of time, and
   subsequently adjusting the electric current (I) fed to the clutch coils (4).

9. The method (10) according to claim 1,
   wherein, upon determination that a slippage of the electromagnetic clutch (1) is present, a present value of the electric current (I) at the clutch coils (4) is compared to a predetermined maximum current value,
   when the present value of the electric current (I) at the clutch coils (4) is determined to be below the maximum current value, the value of the electric current (I) fed to the clutch coils (4) is increased, and
   when the present value of the electric current (I) at the clutch coils (4) is determined to be at or above the maximum current value, the value of the electric current (I) fed to the clutch coils (4) is reduced.

10. The method (10) according to claim 1,
    wherein in case no slippage of the electromagnetic clutch (1) is detected, the present value of the electric current (I) at the clutch coils (4) is compared to a predetermined minimum current value,
    when the present value of the electric current (I) at the clutch coils (4) is determined to be above the minimum current value, the value of the electric current (I) fed to the clutch coils (4) is reduced to the minimum current value,
    when the present value of the electric current (I) at the clutch coils (4) is determined to be at or below the minimum current value, the value of the electric current (I) fed to the clutch coils (4) is held at or increased to the minimum current value.

11. The method (10) according to claim 1, comprising the step of:
    switching the electromagnetic clutch (1) into a slippage state by reducing the electromagnetic clutch force sufficiently to deactivate the compressor (2), upon a request by either a user or a superordinate system for a deactivation of an air conditioning operation.

12. The method (10) according to claim 1,
    wherein the method (10) is operated repeatedly, unless the electromagnetic clutch (1) is purposely switched into a slippage state.

13. The method (10) according to claim 1,
    wherein the electric current (I) fed to the clutch coils (4) is adjusted by the pulse width modulation controller (6) only when the detected slippage differs from a predetermined target slippage value by more than a predetermined threshold slippage deviation.

14. The method (10) according to claim 13,
    wherein the threshold slippage deviation is predetermined as an preset absolute difference between the rpms of the drive shaft (3) and the electromagnetic clutch (1) or as a preset ratio of the rpms of the drive shaft (3) to the rpms the electromagnetic clutch (1).

15. An air conditioning compressor (2) for a motor vehicle (11), comprising:
    an electromagnetic clutch (1) configured to transmit a torque to a drive shaft (3) of the compressor (2)

depending on an electric current (I) being fed to clutch coils (4) of the electromagnetic clutch (1) as to generate an electromagnetic clutch force, a slippage sensor (5) configured to monitor a slippage of the electromagnetic clutch (1), the slippage being determined by a difference between rpms of the electromagnetic clutch (1) and rpms of the drive shaft (3), and a pulse modulation controller (6), which is electrically attached to the clutch coils (4) and which is configured to modulate a pulse width of the electric current (I) being fed to the clutch coils (4).

16. A motor vehicle (11) comprising an air conditioning system with an air conditioning compressor (2) according to claim 15, and an external power device (12) incorporating at least one of an electric motor and a combustion engine for propelling the motor vehicle (11), the external power device (12) driving the electromagnetic clutch (1) of the compressor (2).

* * * * *